United States Patent
Shinohara et al.

(10) Patent No.: US 9,556,879 B2
(45) Date of Patent: Jan. 31, 2017

(54) COMPRESSOR

(75) Inventors: Hitoshi Shinohara, Hiroshima (JP); Mitsuhiko Ota, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 904 days.

(21) Appl. No.: 13/993,486

(22) PCT Filed: Jul. 21, 2011

(86) PCT No.: PCT/JP2011/066586
§ 371 (c)(1),
(2), (4) Date: Jun. 12, 2013

(87) PCT Pub. No.: WO2012/114554
PCT Pub. Date: Aug. 30, 2012

(65) Prior Publication Data
US 2013/0272853 A1 Oct. 17, 2013

(30) Foreign Application Priority Data
Feb. 25, 2011 (JP) .................................. 2011-040721

(51) Int. Cl.
*F04D 29/08* (2006.01)
*F04D 17/12* (2006.01)
*F04D 29/42* (2006.01)

(52) U.S. Cl.
CPC ................ *F04D 29/08* (2013.01); *F04D 17/12* (2013.01); *F04D 29/083* (2013.01); *F04D 29/4206* (2013.01)

(58) Field of Classification Search
CPC ........ F04D 29/08; F04D 29/083; F04D 29/40; F04D 29/4206; F04D 29/582; F04D 17/12; F04D 17/125; F04D 17/10; F04D 17/122; F05B 2240/14; F05B 2240/57
(Continued)

(56) References Cited

U.S. PATENT DOCUMENTS

| 3,981,626 A | | 9/1976 | Onal | |
|---|---|---|---|---|
| 5,846,052 A | * | 12/1998 | Kameda | ................ F04D 29/086 415/182.1 |
| 7,032,905 B2 | * | 4/2006 | Mullally | ................ F16J 15/024 277/626 |

FOREIGN PATENT DOCUMENTS

| CN | 201273302 | 7/2009 |
|---|---|---|
| CN | 201273305 | 7/2009 |

(Continued)

OTHER PUBLICATIONS

Notification of Grant of Invention Patent issued May 6, 2016 in Chinese patent application No. 201180056744.X (with English translation).

(Continued)

*Primary Examiner* — Dwayne J White
*Assistant Examiner* — Adam W Brown
(74) *Attorney, Agent, or Firm* — Wenderoth, Lind & Ponack, L.L.P.

(57) ABSTRACT

A compressor is provided with a substantially tubular compressor casing, a substantially circular lid that is provided inside an inner periphery of the compressor casing so as to close off an end surface of the compressor casing, a space that is enclosed by the lid and an inner circumferential surface of the compressor casing so as to accommodate a blade, and seal member that is provided in a circumferential direction on the space side of an outer circumferential surface of the lid, wherein a slit part is provided on the lid, radially inside the outer circumferential surface, where the seal member is provided, so as to extend in the axial direction from the space side of the lid.

1 Claim, 3 Drawing Sheets

(58) Field of Classification Search
USPC .................................................... 415/214.1
See application file for complete search history.

(56) References Cited

FOREIGN PATENT DOCUMENTS

| CN | 101666314 | 3/2010 |
|---|---|---|
| EP | 0 766 007 | 4/1997 |
| JP | 55-64191 | 5/1980 |
| JP | 9-88864 | 3/1997 |
| JP | 9-166220 | 6/1997 |

OTHER PUBLICATIONS

Partial Translation of International Search Report issued Aug. 30, 2011 in International Application No. PCT/JP2011/066586.
Partial Translation of Written Opinion of the International Searching Authority issued Aug. 30, 2011 in International Application No. PCT/JP2011/066586.
Office Action issued Mar. 3, 2015 in corresponding Chinese patent application No. 201180056744.X (with English translation).

* cited by examiner

COMPRESSOR

TECHNICAL FIELD

The present invention relates to a vertical split type (barrel) compressor, and more particularly, to a seal structure.

BACKGROUND ART

The compressor casing (hereinafter referred to as "casing") of a vertical split type compressor generally includes components such as rotors, blades, and so forth, in the interior thereof. In the casing, which accommodates the components therein, end lids, which are called head, are provided at both ends in the axial direction of the casing. The heads are provided so as to confine the components from both ends in the axial direction of the casing. O-rings for preventing leakage of compressed fluid are provided between the outer circumferential surfaces of the heads and the inner circumferential surface of the casing (see, for example, PTL 1).

As a seal structure using O-rings, PTL 1 discloses a structure in which the O-ring is provided by forming a recessed part on the outer circumferential surface of the head, providing a ring-shaped thin O-ring-retaining ring in this recessed part, and providing an O-ring groove on the outer circumference of the O-ring-retaining ring. In addition, an O-ring groove is also provided on the end surface of the O-ring-retaining ring (the surface orthogonal to the axial direction of the compressor), thereby providing a seal structure for sealing a gap formed with respect to the side surface of the recessed part that is provided on the outer circumferential surface of the head (the surface orthogonal to the axial direction of the compressor).

CITATION LIST

Patent Literature

{PTL 1} Japanese Examined Patent Application, Publication No. S58-6079

SUMMARY OF INVENTION

Technical Problem

However, with the invention described in PTL 1, when pressure is applied to the O-ring-retaining ring in the axial direction of the compressor, and the O-ring provided on the end surface of the O-ring-retaining ring is pushed towards the side surface of the recessed part, there is a risk that the O-ring-retaining ring cannot move outward in the radial direction of the head due to the pushing force acting on the O-ring-retaining ring in the axial direction of the compressor.

In addition, because the O-ring-retaining ring is thin, there is a problem in that it is difficult to process the O-ring grooves for fitting the O-ring on the outer circumferential surface or the side surface of the O-ring-retaining ring.

The present invention has been made in light of the above-described circumstances, and an object thereof is to provide a compressor having a seal structure capable of providing an effective seal with simple structure.

Solution to Problem

In order to solve the problems described above, a compressor according to the present invention employs the following solutions.

Specifically, a compressor according to the present invention includes a substantially tubular compressor casing; a substantially circular lid that is provided inside an inner circumferential surface of the compressor casing so as to close off an end of the compressor casing; a space that is enclosed by the lid and the inner circumferential surface of the compressor casing and that accommodates a blade; and a seal member that is provided to extend in a circumferential direction on an outer circumferential surface of the lid which is adjacent to the space, wherein a slit part is provided in the lid so as to be located radially inside the outer circumferential surface where the seal member is located, the slit part is configured to extend in an axial direction of the lid from the space side of the lid.

The slit part is provided on the space side of the lid forming the space, and the slit part is located radially inside the outer circumferential surface where the seal member is provided, so as to extend in the axial direction of the lid. With the aforementioned configuration, when internal pressure is generated in the space, the internal pressure is applied inside the slit part, and a force is applied outward in the radial direction of the compressor casing to the outer circumferential portion of the lid that is sandwiched between the seal member and the slit part. Thus, even when the casing is expanded radially outward due to the internal pressure, causing the inner diameter of the compressor casing to be increased, it is possible to bring the seal member into contact with the inner circumferential surface of the compressor casing. Therefore, it is possible to prevent leakage through the gap between the inner circumferential surface of the compressor casing and the outer circumferential surface of the lid.

The radial position relative to the outer circumferential surface, where the slit part is provided, and the size of the slit part extending in the axial direction are set such that, considering a given internal pressure (for example, an internal pressure during rated operation) is applied to the slit part, the outer circumferential portion of the lid sandwiched between the seal member and the slit part is capable of being deformed outward in its radial direction.

Advantageous Effects of Invention

The slit part is provided on the space side of the lid forming the space, and the split part is located radially inside the outer circumferential surface where the seal member is provided, so as to extend in the axial direction of the lid. With the aforementioned configuration, when internal pressure is generated in the space, the internal pressure is applied inside the slit part, and a force is applied outward in the radial direction of the compressor casing to the outer circumferential portion of the lid that is sandwiched between the seal member and the slit part. Thus, even when the casing is expanded radially outward due to the internal pressure, causing the inner diameter of the compressor casing to be increased, it is possible to bring the seal member into contact with the inner circumferential surface of the compressor casing. Therefore, it is possible to prevent leakage through the gap between the inner circumferential surface of the compressor casing and the outer circumferential surface of the lid.

DESCRIPTION OF EMBODIMENTS

Figure 1:
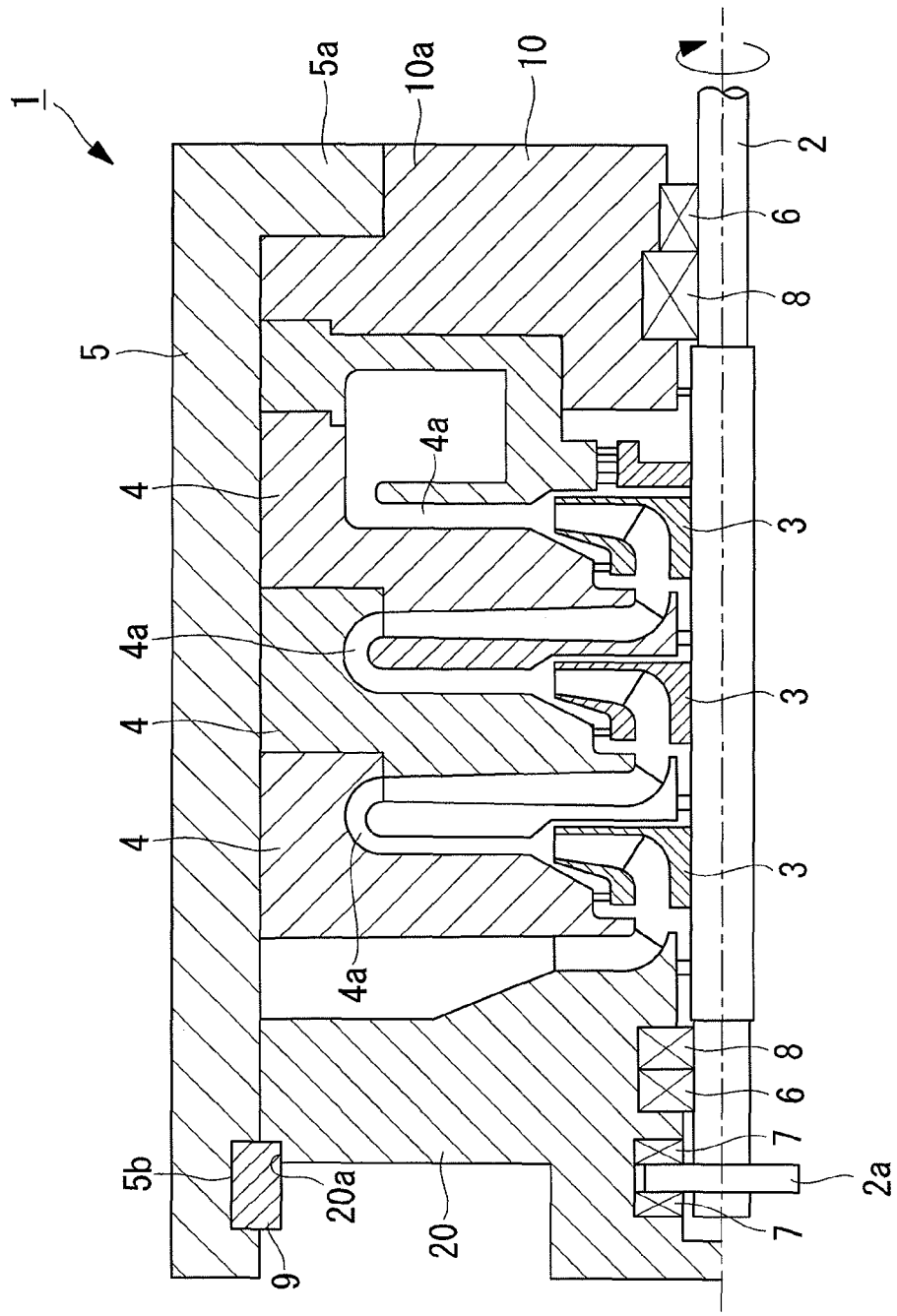
FIG. 1 is an upper half of a longitudinal sectional view showing, in outline, the configuration of a vertical split type compressor according to an embodiment of the present invention.
Figure 2:
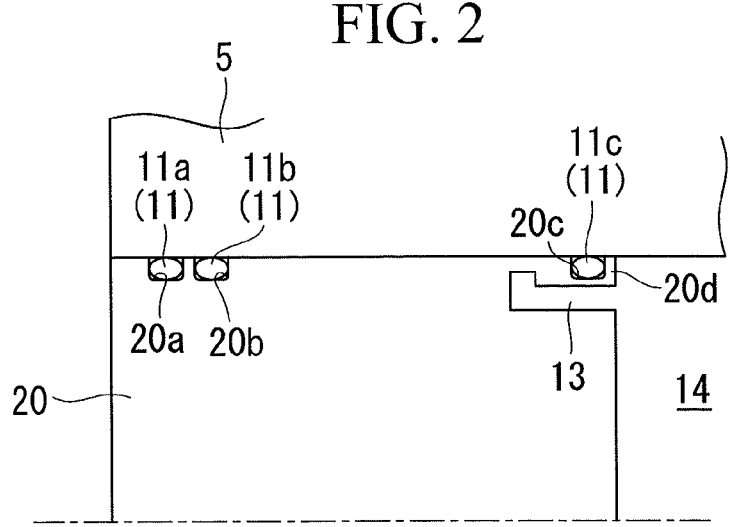
FIG. 2 is a partially enlarged view for showing a portion between the head and the casing shown in FIG. 1.

FIG. 1 shows, in outline, an upper half of a longitudinal sectional view of the configuration of a vertical split type compressor according to an embodiment of the present invention, and FIG. 2 shows a partially enlarged view showing a seal structure between the casing and the head shown in FIG. 1.

The vertical split type (barrel) compressor 1 is mainly configured with a substantially tubular compressor casing (hereinafter referred to as "casing") 5, substantially circular heads (lids) 10 and 20 that are provided at the inner periphery side of the casing 5 so as to close off the end surfaces of the casing 5, a space 14 that is enclosed by the heads 10 and 20 and the inner circumferential surface of the casing 5 to accommodate impellers (blades) 3 and a rotating shaft 2 (see FIG. 2), and an O-ring (seal means) 11c that is provided on the space 14 side of the outer circumferential surface of each of the heads 10 and 20 so as to extend in the circumferential direction (see FIG. 2).

The casing 5 has a substantially cylindrical shape and is capable of housing the rotating shaft 2, the impellers 3, and the heads 10 and 20 in the interior thereof. The drive-end (the right side in FIG. 1) of the casing 5 is provided with a step portion 5a that projects inward in the radial direction thereof so as to engage with a step portion 10a provided on the drive-end head 10, which will be described below. In addition, the non-drive-end (the left side in FIG. 1) of the casing 5 is provided with a key slot 5b located at a circumferential position on the inner circumferential surface thereof so as to engage with a shearing key 9, which will be described below.

The rotating shaft 2 is provided substantially at the center of the casing 5 such that the shaft center thereof and the center axis of the casing 5 are substantially coaxial. The rotating shaft 2 is connected, at the drive-end thereof, to a steam turbine (not shown) etc., which is a driving source. The rotating shaft 2 is rotatably supported by journal bearings 6 in the vicinities of the drive-end and the non-drive-end.

In addition, a thrust collar 2a is provided between the journal bearing 6 provided in the vicinity of the non-drive-end of the rotating shaft 2 and the non-drive-end of the rotating shaft 2 so as to project outward in the radial direction of the rotating shaft 2. The force (thrust) that is applied in the axial direction of the rotating shaft 2 is received by the thrust collar 2a and thrust bearings 7 that are provided on the side surfaces (the surfaces on the drive-end side and on the non-drive-end side) of the thrust collar 2a. Furthermore, the rotating shaft 2 is provided with the impellers 3.

For example, three impellers 3 are provided. The impellers 3 suck and compress gas (fluid), such as, for example, ethylene, propylene, and methane, as the rotating shaft 2 is rotatingly driven. The gas compressed with the impellers 3 is guided through a flow path 4a provided in diaphragm 4 to an inlet of the downstream impeller 3 provided at the drive-end side of the rotating shaft 2.

For example, three diaphragms 4 are provided. The diaphragms 4 are provided so as to surround the respective impellers 3 at the outer side thereof in the radial direction. The diaphragms 4 have substantially the same outer diameter as the inner diameter of the casing 5. The diaphragms 4 are provided with the flow path 4a through which the gas that has been compressed with the impellers 3 (compressed fluid) is guided to the inlet of the downstream impeller 3.

The heads 10 and 20 are provided in the interior of the casing 5 so as to confine the impellers 3 and the diaphragms 4 from both ends in the axial direction of the casing 5. Each of the heads 10 and 20 has the journal bearing 6, which allows rotation of the rotating shaft 2, at its inner periphery side. The heads 10 and 20 have substantially the same outer diameters as the inner diameter of the casing 5. In addition, each of the heads 10 and 20 is provided with a gas seal 8 at the impeller 3 side of the journal bearing 6 on the inner periphery side thereof. The gas seals 8 prevent leakage of the gas that has been compressed with the impellers 3 through the gap between the rotating shaft 2 and the respective heads 10 and 20.

The heads 10 and 20 consist of the drive-end head 10 and the non-drive-end head 20. The drive-end of the drive-end head 10 is formed as a step portion 10a that is recessed radially inward so as to be engaged with the above-mentioned step portion 5a of the casing 5. In addition, the radially outside portion of the non-drive-end of the non-drive-end head 20 is provided with a mating portion 20a that restricts movement of the non-drive-end head 20 in the axial direction of the casing 5 by fitting with the shearing key 9 fitted into the key slot 5b provided on the inner circumferential surface of the above-mentioned casing 5.

The shearing key 9 is a ring whose cross-section orthogonal to the axial direction of the casing 5 has a substantially quadrangular shape. As described above, the shearing key 9 is fitted so as to connect the key slot 5b provided on the inner circumferential surface of the casing 5 and the mating portion 20a provided on the radially outside portion of the non-drive-end head 20. By fitting the shearing key 9 between the key slot 5b and the mating portion 20a in this manner, the movement of the non-drive-end head 20 in the axial direction of the casing 5 is restricted.

Next, a seal structure between the non-drive-end head 20 and the casing 5 shown in FIG. 1 will be described using FIG. 2. Here, the right-hand side in FIG. 2 shows the space 14 holding the gas that has been compressed with the impellers 3 (see FIG. 1).

Three O-ring grooves 20a, 20b, and 20c are provided in the circumferential direction in the vicinities of both axial end portions of the outer circumferential surface of the non-drive-end head 20. The O-ring grooves 20a and 20b are provided in the vicinity of the left end portion on the outer circumferential surface of the non-drive-end head 20 in FIG. 2, and the O-ring groove 20c is provided in the vicinity of the end portion at the space 14 side (the right side in FIG. 2) on the outer circumferential surface of the non-drive-end head 20.

These O-ring grooves 20a, 20b, and 20c are provided with O-rings 11a, 11b, and 11c, respectively.

A slit part 13 is provided on the non-drive-end head 20, radially inside the outer circumferential surface, where the O-ring 11c is provided, so as to extend in the axial direction from the space 14 side of the non-drive-end head 20. As shown in FIG. 2, the slit part 13 is formed so as to have an L-shaped cross-section in the axial direction of the non-drive-end head 20. The outer circumferential portion (hereinafter referred to as "arm portion") 20d of the non-driveend head 20, which is formed by extension of the L-shaped slit in the main axis thereof and the outer circumferential surface of the non-drive-end head 20, is provided with the O-ring groove 20c housing the above-mentioned O-ring 11c on the outer circumferential surface thereof.

A case in which the internal pressure is applied to the space 14 shown in FIG. 2 will be described below.

Due to the internal pressure in the space 14, the space 14 side of the casing 5 is expanded radially outward. At the same time, because the slit part 13 is provided on the non-drive-end head 20 so as to have an opening in the end surface on the space 14 side of the non-drive-end head 20, the internal pressure is also applied to the slit part 13. Therefore, a force is applied to the arm portion 20d outwardly in the radial direction of the non-drive-end head 20 (upward in FIG. 2).

As described above, due to the additional outward force applied to the arm portion 20d, the O-ring 11c provided at the upper side (outer circumference side) of the arm portion 20d is further brought into contact with the inner circumferential surface side of the casing 5. Therefore, even when the internal pressure is applied to the space 14, causing the casing 5 to expand, it is possible to maintain airtight condition by ensuring squeezing of the O-ring 11c by bringing the O-ring 11c into contact with the inner circumferential surface of the casing 5.

As described above, the following advantages and effects can be achieved by the compressor 1 according to this embodiment.

The slit part 13 is provided on the space 14 side of the non-drive-end head (lid) 20 forming the space 14, radially inside the outer circumferential surface, where the O-ring (seal means) 11c is provided, so as to extend in the axial direction of the non-drive-end head 20. By the above-mentioned configuration, when the internal pressure is generated in the space 14, the internal pressure is also applied inside the slit part 13, and a force is applied to the arm portion (the outer circumferential portion of the non-drive-end head 20) 20d, which is sandwiched between the O-ring 11c and the slit part 13, outwardly in the radial direction of the casing (compressor casing) 5. Thus, even when the casing 5 is expanded radially outward due to the internal pressure, causing the inner diameter of the casing 5 to be increased, it is possible to bring the O-ring 11c into contact with the inner circumferential surface of the casing 5. Therefore, it is possible to prevent leakage of the gas through the gap between the inner circumferential surface of the casing 5 and the outer circumferential surface of the non-drive-end head 20.

In this embodiment, the slit part 13 is described as having an opening in the end surface on the space 14 side of the non-drive-end head 20 and to extend in the axial direction of the non-drive-end head 20. However, the slit part 13 of the present invention is not limited to this embodiment, and as illustrated in modification 1, the slit part 13 may have an opening in the outer circumferential surface of the non-drive-end head 20, in the vicinity of the space 14 side.

Figure 3:
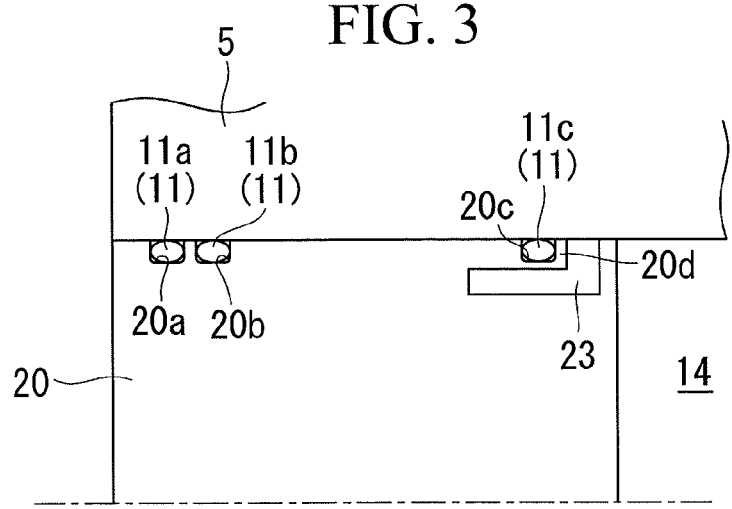
FIG. 3 is a partially enlarged view for showing a portion between the head and the casing according to modification 1 of the present invention.

FIG. 3 shows, in outline, the seal structure formed by the header having a slit part according to modification 1 and the casing.

The slit part 23 has an opening, in the outer circumferential surface of the non-drive-end head 20, in the vicinity of the space 14 and extends towards the radial inside of the O-ring groove 20c that is provided on the non-drive-end head 20 and in which the O-ring 11c is accommodated. As shown in FIG. 3, the slit part 23, which extends toward the radial inside of the non-drive-end head 20 from the outer circumferential surface of the non-drive-end head 20, then extends below the O-ring groove 20c (in the axis direction of the non-drive-end head 20) such that the cross-section in the axial direction of the non-drive-end head 20 has an L-shape and such that the main axis of the L-shape lies along the axial direction of the non-drive-end head 20.

Next, as shown in FIG. 3, a case in which internal pressure is applied to the space 14 will be described.

Due to the internal pressure in the space 14, the space 14 side of the casing 5 is expanded radially outward. Thus, a gap is created between the space 14 side of the inner circumferential surface of the casing 5 and the space 14 side of the outer circumferential surface of the non-drive-end head 20.

However, because the slit part 23 has the opening on the space 14 side of the outer circumferential surface of the non-drive-end head 20, the internal pressure that has flowed through the gap created between the space 14 side of the inner circumferential surface of the casing 5 and the space 14 side of the outer circumferential surface of the non-drive-end head 20 is applied to the slit part 23. Therefore, a force is applied to the arm portion 20d outwardly in the radial direction of the non-drive-end head 20 (upward in FIG. 3).

As described above, due to the outward force applied to the arm portion 20d, the O-ring 11c provided on the upper part of the arm portion 20d is further brought into contact with the inner circumferential surface of the casing 5. Therefore, even when the internal pressure is applied to the space 14, causing the casing 5 to expand, it is possible to maintain airtight condition by ensuring squeezing of the O-ring 11c by bringing the O-ring 11c provided on the arm portion 20d into contact with the inner circumferential surface of the casing 5.

Figure 4:
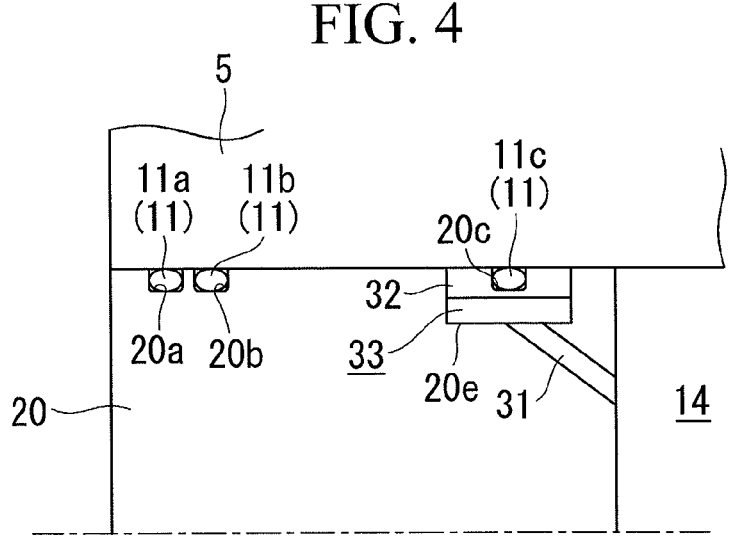
FIG. 4 is a partially enlarged view for showing a portion between the head and the casing according to modification 2 of the present invention.

In addition, as shown in FIG. 4, modification 2 of the present invention may be configured with an O-ring-retaining ring 32 and a through channel 31.

On the space 14 side of the outer circumferential surface of the non-drive-end head 20, a groove portion 20e that is recessed inwardly in the radial direction of the non-drive-end head 20 is provided so as to extend in the circumferential direction. The ring-shaped O-ring-retaining ring 32 is accommodated in the groove portion 20e. The depth of the groove portion 20e towards the inside of the non-drive-end head 20 in the radial direction is greater than the thickness of the O-ring-retaining ring 32.

The non-drive-end head 20 has the through channel 31, which has an opening in the end surface on the space 14 side. The through channel 31 is inclined and extends in the upper-left direction towards the groove portion 20e so as to provide another opening in the bottom part of the groove portion 20e provided on the non-drive-end head 20.

The O-ring-retaining ring 32 is provided with, on the outer circumferential surface thereof, the O-ring groove 20c capable of retaining the O-ring 11c. Both end surfaces of the O-ring retaining member 32 in the width direction thereof (the axial direction of the non-drive-end head 20) are welded to the side surfaces of the groove portion 20e of the non-drive-end head 20 such that the outer circumferential surface of the O-ring retaining member 32 is flat with the outer circumferential surface of the non-drive-end head 20. Therefore, a space 33 is formed between the inner circumferential surface of the O-ring-retaining ring 32 and the bottom part of the groove portion 20e.

Next, a case in which internal pressure is applied to the space 14 shown in FIG. 4 will be described.

Due to the internal pressure in the space 14, the space 14 side of the casing 5 is expanded radially outward. At the same time, because one end of the through portion 31 has the opening in the end surface on the space 14 side of the non-drive-end head 20, and the other end of the through portion 31 has the opening in the space 33, the internal pressure is applied to the space 33. Therefore, the force is applied to the O-ring-retaining ring 32 outwardly in the radial direction of the non-drive-end head 20 (upward in FIG. 4).

Here, because both end surfaces of the O-ring-retaining ring 32 are welded to the side surfaces of the groove portion 20e of the non-drive-end head 20, due to the outward force that is applied to the O-ring-retaining ring 32, the O-ring 11c, which is provided at substantially the central portion of the O-ring-retaining ring 32, is further brought into contact with the inner circumferential surface of the casing 5. Therefore, even when the internal pressure is applied to the space 14, causing the casing 5 to expand, it is possible to maintain airtight condition by ensuring squeezing of the O-ring 11c by bringing the O-ring 11c into contact with the inner circumferential surface of the casing 5.

In addition, in this embodiment and in the respective modifications, the non-drive-end head 20 is described as being provided with the slit parts 13 and 23, the O-ring-retaining ring 32, and the through channel 31. However, similarly, the space 14 side of the drive-end head 10 may be provided with the slit parts 13 and 23, the O-ring-retaining ring 32, and the through channel 31.

REFERENCE SIGNS LIST

1 compressor
3 blade (impeller)
5 compressor casing (casing)
10, 20 lid (head, drive-end head, non-drive-end head)
11c seal means (O-ring)
13 slit part
14 space

The invention claimed is:

1. A compressor comprising:
a substantially tubular compressor casing;
a substantially circular lid that is provided inside an inner circumferential surface of the compressor casing so as to close off an end of the compressor casing;
a space that is enclosed by the lid and the inner circumferential surface of the compressor casing and that accommodates a blade; and
a seal member that is provided to extend in a circumferential direction on an outer circumferential surface of the lid which is adjacent to the space,
wherein a slit part is provided in the lid so as to be located radially inside the outer circumferential surface where the seal member is located, the slit part is configured to extend in an axial direction of the lid from the space side of the lid.

* * * * *